(12) United States Patent
Sheynblat et al.

(10) Patent No.: US 9,814,016 B2
(45) Date of Patent: *Nov. 7, 2017

(54) LOCAL AREA NETWORK ASSISTED POSITIONING

(71) Applicant: QUALCOMM Incorporated, San Diego, CA (US)

(72) Inventors: Leonid Sheynblat, Hillsborough, CA (US); Mark Leo Moeglein, Lummi Island, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,834

(22) Filed: Jan. 12, 2017

(65) Prior Publication Data

US 2017/0127375 A1    May 4, 2017

Related U.S. Application Data

(63) Continuation of application No. 13/655,300, filed on Oct. 18, 2012, which is a continuation of application
(Continued)

(51) Int. Cl.
*H04W 64/00* (2009.01)
*H04L 5/00* (2006.01)
*H04W 84/12* (2009.01)

(52) U.S. Cl.
CPC ......... *H04W 64/003* (2013.01); *H04L 5/0035* (2013.01); *H04W 84/12* (2013.01)

(58) Field of Classification Search
CPC .................................................. H04W 64/00
See application file for complete search history.

(56) References Cited

U.S. PATENT DOCUMENTS

| 4,463,357 A | 7/1984 | MacDoran |
| 4,965,586 A | 10/1990 | O'Neill et al. |

(Continued)

FOREIGN PATENT DOCUMENTS

| CA | 2296812 A1 | 8/2000 |
| CN | 1334688 A | 2/2002 |

(Continued)

OTHER PUBLICATIONS

3GPP TS 25.305 V7.3.0, (Jun. 2006), 3rd Generation Partnership Project; Technical Specification Group Radio Access Network, "Stage 2 functional specification of User Equipment (UE) positioning in UTRAN (Release 7)," pp. 1-79.

(Continued)

*Primary Examiner* — Muthuswamy Manoharan
(74) *Attorney, Agent, or Firm* — Hunter Clark PLLC

(57) ABSTRACT

A system and method of locating a position of a wireless device in range of one or more base stations. Three signals are received that each contain a unique identifier for a base station. An estimate of the distance between the wireless device and each base station is performed. Previously determined locations for each base station are referenced. At least one of the three base stations is capable of communication to remote locations and unavailable to the wireless device for communication to remote locations.

31 Claims, 14 Drawing Sheets

Related U.S. Application Data

No. 10/936,130, filed on Sep. 7, 2004, now Pat. No. 8,483,717, which is a continuation-in-part of application No. 10/877,205, filed on Jun. 25, 2004, now Pat. No. 8,971,913.

(60) Provisional application No. 60/483,094, filed on Jun. 27, 2003.

(56) References Cited

U.S. PATENT DOCUMENTS

| | | |
|---|---|---|
| 5,276,905 A | 1/1994 | Hurst et al. |
| 5,276,906 A | 1/1994 | Felix |
| 5,327,144 A | 7/1994 | Stilp et al. |
| 5,467,282 A | 11/1995 | Dennis |
| 5,512,908 A | 4/1996 | Herrick |
| 5,564,079 A | 10/1996 | Olsson |
| 5,629,855 A | 5/1997 | Kyrtsos et al. |
| 5,708,975 A | 1/1998 | Heiskari et al. |
| 5,717,406 A | 2/1998 | Sanderford et al. |
| 5,805,581 A | 9/1998 | Uchida et al. |
| 5,812,087 A | 9/1998 | Krasner |
| 5,841,396 A | 11/1998 | Krasner |
| 5,874,914 A | 2/1999 | Krasner |
| 5,945,944 A | 8/1999 | Krasner |
| 5,948,043 A | 9/1999 | Mathis |
| 5,982,324 A | 11/1999 | Watters et al. |
| 5,999,124 A | 12/1999 | Sheynblat |
| 6,002,936 A | 12/1999 | Roel-Ng et al. |
| 6,026,304 A | 2/2000 | Hilsenrath et al. |
| 6,055,434 A | 4/2000 | Seraj |
| 6,061,018 A | 5/2000 | Sheynblat |
| 6,091,362 A | 7/2000 | Stilp et al. |
| 6,104,338 A | 8/2000 | Krasner |
| 6,108,558 A | 8/2000 | Vanderspool, II |
| 6,111,538 A | 8/2000 | Schuchman et al. |
| 6,128,492 A | 10/2000 | Chung |
| 6,147,644 A | 11/2000 | Castles et al. |
| 6,185,427 B1 | 2/2001 | Krasner et al. |
| 6,208,290 B1 | 3/2001 | Krasner |
| 6,215,442 B1 | 4/2001 | Sheynblat et al. |
| 6,230,018 B1 | 5/2001 | Watters et al. |
| 6,236,365 B1 | 5/2001 | Leblanc et al. |
| 6,236,635 B1 | 5/2001 | Miyamoto et al. |
| 6,249,252 B1 | 6/2001 | Dupray |
| 6,271,788 B1 | 8/2001 | Longaker et al. |
| 6,275,707 B1 | 8/2001 | Reed et al. |
| 6,327,533 B1 | 12/2001 | Chou |
| 6,353,406 B1 | 3/2002 | Lanzl et al. |
| 6,353,412 B1 | 3/2002 | Soliman |
| 6,369,754 B1 | 4/2002 | Levanon |
| 6,373,432 B1 | 4/2002 | Rabinowitz et al. |
| 6,389,291 B1 | 5/2002 | Pande et al. |
| 6,408,178 B1 | 6/2002 | Wickstrom et al. |
| 6,414,635 B1 | 7/2002 | Stewart et al. |
| 6,415,154 B1 | 7/2002 | Wang et al. |
| 6,420,999 B1 | 7/2002 | Vayanos |
| 6,430,415 B1 | 8/2002 | Agashe et al. |
| 6,445,927 B1 | 9/2002 | King et al. |
| 6,466,938 B1 | 10/2002 | Goldberg |
| 6,473,038 B2 | 10/2002 | Patwari et al. |
| 6,515,623 B2 | 2/2003 | Johnson |
| 6,570,529 B2 | 5/2003 | Richton et al. |
| 6,593,863 B2 | 7/2003 | Pitio |
| 6,597,916 B2 | 7/2003 | Edge |
| 6,650,288 B1 | 11/2003 | Pitt et al. |
| 6,677,894 B2 | 1/2004 | Sheynblat et al. |
| 6,677,895 B1 | 1/2004 | Holt |
| 6,704,574 B2 | 3/2004 | Lin |
| 6,748,224 B1 * | 6/2004 | Chen ............... G01S 5/0036 342/451 |
| 6,754,488 B1 | 6/2004 | Won et al. |
| 6,757,545 B2 | 6/2004 | Nowak et al. |
| 6,799,047 B1 | 9/2004 | Bahl et al. |
| 6,801,778 B2 | 10/2004 | Koorapaty et al. |
| 6,865,395 B2 | 3/2005 | Riley |
| 6,888,811 B2 | 5/2005 | Eaton et al. |
| 6,937,866 B2 | 8/2005 | Duffett-Smith et al. |
| 6,937,867 B2 | 8/2005 | Oda et al. |
| 6,941,145 B2 | 9/2005 | Ogino et al. |
| 6,956,527 B2 | 10/2005 | Rogers et al. |
| 6,973,320 B2 | 12/2005 | Brown et al. |
| 6,990,428 B1 | 1/2006 | Kaiser et al. |
| 6,995,708 B2 | 2/2006 | Schmidt |
| 7,006,834 B2 | 2/2006 | Gaal et al. |
| 7,006,838 B2 | 2/2006 | Diener et al. |
| 7,039,418 B2 | 5/2006 | Amerga et al. |
| 7,047,022 B2 | 5/2006 | Aoyama |
| 7,054,627 B1 | 5/2006 | Hillman |
| 7,057,557 B2 | 6/2006 | Lee |
| 7,068,999 B2 | 6/2006 | Ballai |
| 7,069,024 B2 | 6/2006 | Sharony |
| 7,082,311 B2 | 7/2006 | Hefner et al. |
| 7,110,774 B1 | 9/2006 | Davis et al. |
| 7,113,792 B2 | 9/2006 | Glazko et al. |
| 7,127,257 B2 | 10/2006 | Riley et al. |
| 7,130,646 B2 | 10/2006 | Wang |
| 7,139,580 B2 | 11/2006 | Stein et al. |
| 7,142,848 B2 | 11/2006 | Owen et al. |
| 7,149,531 B2 | 12/2006 | Misikangas |
| 7,158,798 B2 | 1/2007 | Lee et al. |
| 7,203,503 B2 | 4/2007 | Cedervall et al. |
| 7,206,585 B2 | 4/2007 | Gilham et al. |
| 7,215,281 B2 | 5/2007 | Tekinay et al. |
| 7,224,982 B2 | 5/2007 | Ormson |
| 7,224,983 B2 | 5/2007 | Budka et al. |
| 7,248,858 B2 | 7/2007 | Barber et al. |
| 7,251,493 B2 | 7/2007 | Camp, Jr. et al. |
| 7,254,400 B1 | 8/2007 | Sakakura |
| 7,257,411 B2 | 8/2007 | Gwon et al. |
| 7,257,413 B2 | 8/2007 | Sheynblat |
| 7,277,054 B2 | 10/2007 | Alanen et al. |
| 7,280,505 B2 | 10/2007 | Chaskar et al. |
| 7,295,808 B2 | 11/2007 | Soliman |
| 7,295,846 B2 | 11/2007 | Daigremont et al. |
| 7,319,878 B2 | 1/2008 | Sheynblat et al. |
| 7,355,995 B2 | 4/2008 | Ogino et al. |
| 7,369,859 B2 | 5/2008 | Gallagher |
| 7,502,614 B2 | 3/2009 | Uchida et al. |
| 7,522,588 B2 | 4/2009 | Biacs et al. |
| 7,590,424 B2 | 9/2009 | Yamamoto et al. |
| 7,613,155 B2 | 11/2009 | Shim |
| 7,706,813 B2 | 4/2010 | Shim |
| 7,764,231 B1 | 7/2010 | Karr et al. |
| 7,778,639 B2 | 8/2010 | Shim |
| 7,831,263 B2 | 11/2010 | Sheynblat et al. |
| 7,873,375 B2 | 1/2011 | Annunziato et al. |
| 7,899,472 B1 | 3/2011 | Wang |
| 8,068,056 B2 | 11/2011 | Wachter et al. |
| 8,095,155 B2 | 1/2012 | Wang |
| 8,320,934 B2 | 11/2012 | Sheynblat |
| 8,483,717 B2 | 7/2013 | Sheynblat |
| 8,509,731 B2 | 8/2013 | Kholaif et al. |
| 8,855,685 B2 | 10/2014 | Wang |
| 8,909,252 B2 | 12/2014 | Wang |
| 8,918,119 B2 | 12/2014 | Kim et al. |
| 8,971,913 B2 | 3/2015 | Moeglein et al. |
| 9,100,786 B2 | 8/2015 | Wang |
| 9,335,419 B2 | 5/2016 | Moeglein et al. |
| 9,571,963 B2 | 2/2017 | Wang |
| 2002/0016172 A1 | 2/2002 | Kangras et al. |
| 2002/0037705 A1 | 3/2002 | Moerder et al. |
| 2002/0072854 A1 | 6/2002 | Fuchs et al. |
| 2002/0080759 A1 | 6/2002 | Harrington et al. |
| 2002/0086681 A1 | 7/2002 | Gilham et al. |
| 2002/0094821 A1 * | 7/2002 | Kennedy, Jr. ............ G01S 5/10 455/456.3 |
| 2002/0102992 A1 | 8/2002 | Koorapaty et al. |
| 2002/0115448 A1 | 8/2002 | Amerga et al. |
| 2002/0116368 A1 | 8/2002 | Matsumoto |
| 2002/0137526 A1 | 9/2002 | Shinohara |
| 2002/0168989 A1 | 11/2002 | Dooley et al. |
| 2002/0199196 A1 | 12/2002 | Rabinowitz et al. |
| 2003/0006931 A1 | 1/2003 | Mages |

(56) References Cited

U.S. PATENT DOCUMENTS

| | | | |
|---|---|---|---|
| 2003/0008663 A1 | 1/2003 | Stein et al. | |
| 2003/0008664 A1 | 1/2003 | Stein et al. | |
| 2003/0008669 A1 | 1/2003 | Stein et al. | |
| 2003/0022675 A1 | 1/2003 | Mergler | |
| 2003/0040323 A1* | 2/2003 | Pihl | H04W 64/00 455/456.1 |
| 2003/0043073 A1 | 3/2003 | Gray et al. | |
| 2003/0069033 A1 | 4/2003 | Edge et al. | |
| 2003/0096622 A1 | 5/2003 | Moilanen | |
| 2003/0124025 A1 | 7/2003 | Mize et al. | |
| 2003/0125044 A1 | 7/2003 | Deloach et al. | |
| 2003/0125045 A1 | 7/2003 | Riley et al. | |
| 2003/0134648 A1 | 7/2003 | Reed et al. | |
| 2003/0144006 A1 | 7/2003 | Johansson et al. | |
| 2003/0157943 A1 | 8/2003 | Sabat, Jr. | |
| 2003/0176196 A1 | 9/2003 | Hall et al. | |
| 2003/0210142 A1 | 11/2003 | Freathy et al. | |
| 2003/0216143 A1 | 11/2003 | Roese et al. | |
| 2003/0220765 A1 | 11/2003 | Overy et al. | |
| 2003/0222819 A1 | 12/2003 | Karr et al. | |
| 2003/0235172 A1 | 12/2003 | Wood | |
| 2004/0002346 A1 | 1/2004 | Santhoff | |
| 2004/0043765 A1 | 3/2004 | Tolhurst | |
| 2004/0053625 A1 | 3/2004 | Bye | |
| 2004/0077361 A1 | 4/2004 | Ishidoshiro | |
| 2004/0085909 A1 | 5/2004 | Soliman | |
| 2004/0127229 A1 | 7/2004 | Ishii | |
| 2004/0162090 A1 | 8/2004 | Suryanarayana et al. | |
| 2004/0198375 A1 | 10/2004 | Schwengler et al. | |
| 2004/0203567 A1 | 10/2004 | Berger | |
| 2004/0203926 A1 | 10/2004 | Ruutu et al. | |
| 2004/0258012 A1 | 12/2004 | Ishii | |
| 2004/0259546 A1 | 12/2004 | Balachandran et al. | |
| 2005/0004527 A1 | 1/2005 | Prescott | |
| 2005/0014497 A1 | 1/2005 | Goren | |
| 2005/0020309 A1 | 1/2005 | Moeglein et al. | |
| 2005/0043038 A1 | 2/2005 | Maanoja et al. | |
| 2005/0062643 A1* | 3/2005 | Pande | G01S 5/0027 342/357.64 |
| 2005/0064877 A1 | 3/2005 | Gum et al. | |
| 2005/0075119 A1 | 4/2005 | Sheha et al. | |
| 2005/0124355 A1 | 6/2005 | Cromer et al. | |
| 2005/0125493 A1 | 6/2005 | Chaskar et al. | |
| 2005/0153687 A1 | 7/2005 | Niemenmaa et al. | |
| 2005/0197137 A1 | 9/2005 | Radic et al. | |
| 2005/0227689 A1 | 10/2005 | Jewett | |
| 2005/0227705 A1 | 10/2005 | Rousu et al. | |
| 2005/0227707 A1 | 10/2005 | Law et al. | |
| 2005/0232189 A1 | 10/2005 | Loushine | |
| 2005/0246334 A1 | 11/2005 | Tao et al. | |
| 2005/0250516 A1 | 11/2005 | Shim | |
| 2005/0255857 A1 | 11/2005 | Kim et al. | |
| 2007/0001867 A1 | 1/2007 | Rowe et al. | |
| 2007/0002813 A1 | 1/2007 | Tenny et al. | |
| 2007/0037586 A1 | 2/2007 | Kim et al. | |
| 2007/0121560 A1 | 5/2007 | Edge | |
| 2007/0140163 A1 | 6/2007 | Meier et al. | |
| 2007/0149240 A1 | 6/2007 | Brok | |
| 2008/0123608 A1 | 5/2008 | Edge et al. | |
| 2008/0280624 A1 | 11/2008 | Wrappe | |
| 2009/0104904 A1 | 4/2009 | Shim | |
| 2009/0143076 A1 | 6/2009 | Wachter et al. | |
| 2010/0130244 A1 | 5/2010 | Hong et al. | |
| 2010/0317391 A1 | 12/2010 | Mody et al. | |
| 2011/0045840 A1 | 2/2011 | Alizadeh-Shabdiz et al. | |
| 2012/0309410 A1 | 12/2012 | Marti et al. | |
| 2013/0095850 A1 | 4/2013 | Sheynblat | |
| 2015/0018009 A1 | 1/2015 | Moeglein et al. | |
| 2015/0057018 A1 | 2/2015 | Moeglein et al. | |
| 2017/0212207 A1 | 7/2017 | Sheynblat | |

FOREIGN PATENT DOCUMENTS

| | | |
|---|---|---|
| CN | 1373371 A | 10/2002 |
| CN | 1375999 A | 10/2002 |
| CN | 1413058 | 4/2003 |
| DE | 10142954 A1 | 4/2003 |
| EP | 0631453 A2 | 12/1994 |
| EP | 0933961 A2 | 8/1999 |
| EP | 1215928 A2 | 6/2002 |
| EP | 1289320 A1 | 3/2003 |
| EP | 1387590 A2 | 2/2004 |
| JP | 6148308 A | 5/1994 |
| JP | H0727578 A | 1/1995 |
| JP | 10213644 | 8/1998 |
| JP | H10509000 A | 9/1998 |
| JP | H11178045 A | 7/1999 |
| JP | 2000501504 A | 2/2000 |
| JP | 2000156881 | 6/2000 |
| JP | 2000244967 A | 9/2000 |
| JP | 2001500256 | 1/2001 |
| JP | 2001061178 A | 3/2001 |
| JP | 2001305210 A | 10/2001 |
| JP | 2001333184 | 11/2001 |
| JP | 2002077965 | 3/2002 |
| JP | 2002510893 | 4/2002 |
| JP | 2002195846 A | 7/2002 |
| JP | 2002236163 A | 8/2002 |
| JP | 2002246976 A | 8/2002 |
| JP | 2002532691 A | 10/2002 |
| JP | 2003014488 A | 1/2003 |
| JP | 2003023384 A | 1/2003 |
| JP | 2003047045 | 2/2003 |
| JP | 2003152633 | 5/2003 |
| JP | 2003520532 A | 7/2003 |
| JP | 2003319443 | 11/2003 |
| JP | 2004040775 | 2/2004 |
| JP | 2004086349 A | 3/2004 |
| JP | 2004129026 A | 4/2004 |
| JP | 2005195429 | 7/2005 |
| JP | 2005525003 A | 8/2005 |
| JP | 2005525016 | 8/2005 |
| JP | 2005536944 A | 12/2005 |
| JP | 2007518979 A | 7/2007 |
| JP | 2007520915 A | 7/2007 |
| KR | 19980702271 | 7/1998 |
| KR | 19990047966 | 7/1999 |
| KR | 20000022270 A | 4/2000 |
| KR | 20010087969 A | 9/2001 |
| KR | 20020073167 | 9/2002 |
| KR | 20030011866 | 2/2003 |
| KR | 20030052838 A | 6/2003 |
| RU | 2001531 C1 | 10/1993 |
| RU | 2163053 C2 | 2/2001 |
| WO | WO-9307684 A1 | 4/1993 |
| WO | WO-9810306 A1 | 3/1998 |
| WO | WO-9810538 A1 | 3/1998 |
| WO | WO-9957576 | 11/1999 |
| WO | 0027143 A1 | 5/2000 |
| WO | WO-0034799 A1 | 6/2000 |
| WO | WO-0120818 A1 | 3/2001 |
| WO | WO-0128272 A1 | 4/2001 |
| WO | WO-0133302 | 5/2001 |
| WO | 0154422 A2 | 7/2001 |
| WO | WO-0195056 A2 | 12/2001 |
| WO | WO-0221873 A1 | 3/2002 |
| WO | WO-0223215 A1 | 3/2002 |
| WO | WO-0246788 | 6/2002 |
| WO | 02071781 A1 | 9/2002 |
| WO | WO-02068986 | 9/2002 |
| WO | 02079797 A1 | 10/2002 |
| WO | 02082850 A1 | 10/2002 |
| WO | WO-03010552 A2 | 2/2003 |
| WO | WO-03021286 A2 | 3/2003 |
| WO | WO-03021851 A2 | 3/2003 |
| WO | WO-03038466 | 5/2003 |
| WO | WO-03058985 A2 | 7/2003 |
| WO | WO-03058986 A2 | 7/2003 |
| WO | WO-03065740 A2 | 8/2003 |
| WO | WO-03094285 A2 | 11/2003 |

(56) References Cited

FOREIGN PATENT DOCUMENTS

| WO | WO-03094564 | A1 | 11/2003 |
|---|---|---|---|
| WO | WO-2004016032 | A1 | 2/2004 |
| WO | WO-2004017092 | A1 | 2/2004 |
| WO | WO-2004019559 | | 3/2004 |
| WO | WO-2004032561 | | 4/2004 |
| WO | WO-2004045110 | | 5/2004 |
| WO | WO-2004071120 | | 8/2004 |
| WO | WO-2004106964 | A2 | 12/2004 |
| WO | WO-2005004527 | A1 | 1/2005 |
| WO | WO-2005004528 | A1 | 1/2005 |
| WO | WO-2005027393 | | 3/2005 |
| WO | WO-2005029120 | | 3/2005 |
| WO | WO-2005046254 | A2 | 5/2005 |
| WO | WO-2005065320 | A2 | 7/2005 |
| WO | WO-2005089384 | A2 | 9/2005 |
| WO | WO-2005106523 | A1 | 11/2005 |
| WO | WO-2007027166 | | 3/2007 |
| WO | WO-2007056738 | A2 | 5/2007 |

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).

3rd Generation Partnership Project 2 "3GPP2": "cdma2000 Packet Data Services; Wireless Local Area Network (WLAN) Inter-working," 3GPP2 X.S0028-000-0, Version 1.0, pp. 1-119 (Jul. 2006).

3rd Generation Partnership Project 2 "3GPP2", Internet Article, Version 1.0 (Online), Oct. 2005, Section 4 (6 pages).

3rd Generation Partnership Project 2 "3GPP2": "TIA/EIA-41-D Location Services Enhancements," 3GPP2 X.S0002, Version 1.0.0, pp. 1-234 (Mar. 2004).

3rd Generation Partnership Project; Technical Specificatiln Group GSM/EDGE Radio Access Network, "Generic access to A/Gb interface; Stage 2 (Release 6)," 3GPP TS 43.318 V6.8.0, pp. 1-71 (Nov. 2006).

3rd Generation Partnership Project; Technical Specification Group GSM/EDGE Radio Access Network, "Functional stage 2 description of Location Services (LCS) in GERAN (Release 4)," 3GPP TS 43.059 V4.7.0, pp. 1-50 (Apr. 2006).

3rd Generation Partnership Project; Technical Specification Group Services and System Aspects, "3GPP system to Wireless Local Area Network (WLAN) interworking; System description (Release 6)," 3GPP TS 23.234 V6.10.0, pp. 1-75 (Sep. 2006).

3rd Generation Partnership Project; Technical Specification Group Services and System Aspects, "Functional stage 2 description of Location Services (LCS)(Release 7)," 3GPP TS 23.271 V7.6.0, pp. 1-141 (Sep. 2006).

Anonymous: "Position Determination Service for cdma2000(R) Spread Spectrum Systems;(Revision of TIA/EIA/IS-801);TIA-801-A" 19000101, Apr. 2004 (Apr. 2004), XP017004816 p. 2.5-p. 2.6.

International Search Report—PCT/US05/032018, International Search Authority—European Patent Office, dated Jan. 17, 2006.

Joint Standard, "Enhanced Wireless 9-1-1 Phase II (Erratum)," J-STD-036-B, pp. 1-344 (Jun. 2006).

Kikuchi T, "What's New, Not Worse Than Wired, Nikkei Electronics," Japan, Nikkei Business Publications, Inc., Mar. 31, 2003, No. 844, pp. 30-31.

Open Mobile Alliance, "Secure User Plane Location Architecture, Candidate Version 1.0," OMA-AD-SUPL-V1_0-20060906-C, pp. 1-80 (Sep. 2006).

Orville R.E., "Development of the National Lightning Detection Network," BAMS, Feb. 2008, 11 pages.

Partial European Search Report—EP10187475—Search Authority—Munich—dated May 25, 2012.

Suzuki Y, "Technologies of Internet Access Communication," Information Processing, Japan, The Information Processing Society of Japan, Apr. 2002, vol. 43, No. 4, pp. 462-467.

Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).

Written Opinion PCT/US05/032018, International Search Authority European Patent Office dated Feb. 3, 2007.

Webster's II New college Dictionary, Houghton Mifflin Company, 2001, pp. 1-4.

\* cited by examiner

LOCAL AREA NETWORK ASSISTED POSITIONING

This application claims the benefit of and is a continuation of U.S. application Ser. No. 13/655,300, entitled "Local Area Network Assisted Positioning," filed on Oct. 18, 2012, which claims the benefit of and is a continuation of U.S. application Ser. No. 10/936,130, entitled "Local Area Network Assisted Positioning," filed on Sep. 7, 2004, which claims the benefit of and is a continuation in part of U.S. application Ser. No. 10/877,205, entitled "Method and Apparatus for Wireless Network Hybrid Positioning," filed on Jun. 25, 2004, which claims the benefit of U.S. Provisional Application Ser. No. 60/483,094, entitled "Method and Apparatus for Wireless Network Hybrid Positioning," filed on Jun. 27, 2003; and U.S. application Ser. No. 10/936, 130 also claims the benefit of and is a continuation in part of US PCT Application Serial No. PCT/US04/20920, entitled "Method and Apparatus for Wireless Network Hybrid Positioning," filed on 28 Jun. 2004, which claims priority to US Provisional Application Ser. No. 60/483,094, entitled "Method and Apparatus for Wireless Network Hybrid Positioning," filed on Jun. 27, 2003.

BACKGROUND

This disclosure relates in general to automated location determination and, more specifically, but not by way of limitation, to determining a location of a wireless device.

There is an ever growing desire to know geographic position of various mobile devices. For example, cellular phone operators are trying to comply with requirements to locate handsets for emergency purposes. Once position is known, emergency personnel can be dispatched to aid resolving the emergency. Knowing geographic location serves many other purposes such as geographic-tied advertising, child supervision, automated parolee supervision, reverse 911, fleet vehicle tracking, etc.

Conventional location techniques have difficulty accurately resolving location in certain situations. Satellite-based location systems suffer from inaccuracies when a clear view the sky is unavailable. Terrestrial-based systems require communication with several base stations that serve as known references during trilateration, but in some scenarios, since these systems were primarily designed for communication purposes there are not enough geographically dispersed base stations within communication range of the mobile device. Even when communication is possible to multiple base stations, multi-path induced inaccuracies can degrade the ability to resolve an accurate location.

Conventional location techniques have a wireless phone interacting with base stations associated with the service to which the wireless phone is subscribed. An almanac of base stations indicates to the wireless phone where the base stations are located. On most occasions, at least couple of base stations are visible to the wireless phone.

Cellular phones often have limited memory to store additional information. Base stations are constantly being added, removed or relocated in a cellular phone network. Almanacs of base stations are occasionally sent to cellular phones to aid in determining location. To communicate and store a large almanac is impractical on some cellular phones.

SUMMARY

A method and system that allow resolving the location of a wireless device are disclosed. Resolving the location in one embodiment relies upon accessing at least one cooperative base station and at least one uncooperative base station. The cooperative base station provides an almanac of base stations that are likely to be near the wireless device. Both cooperative and uncooperative base stations within range can be used to determine the location of the wireless device. The uncooperative base station is not generally available to the wireless device, but can be used to determine distance to the wireless device. An attempt by the wireless device to transport data or voice on the uncooperative base station may or may not be thwarted by the uncooperative base station.

In one embodiment, the population of base stations is reduced to produce a tailored almanac of base stations. The tailored almanac includes information to uniquely identify each base station, and may include location information for the base stations.

In another embodiment, any number of different base station types can be used. The base station could be a cellular phone base station, a wireless local area network, a wireless wide area network, a satellite, a terrestrial location beacon, or any other device that can wirelessly communicate in some mode with the wireless device in a manner that allows unique identification of the device and a distance measurement.

In a variety of other embodiments the general location of the wireless device is determined in different ways. Various embodiments might use the location function integral to the phone, the current cooperative base station and a presumed cell footprint, a number of base stations to find an overlapping cell footprint, a number of cooperative base stations to trilaterate the position, base stations and satellites to trilaterate the position, and/or one or more cooperative base stations that can determine range and angle. Different wireless devices have different capabilities, as do base stations, such that there could be a number of approaches used.

BRIEF DESCRIPTION OF THE DRAWING

The features, objects, and advantages of embodiments of the disclosure will become more apparent from the detailed description set forth below when taken in conjunction with the drawings, in which like elements bear like reference numerals. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
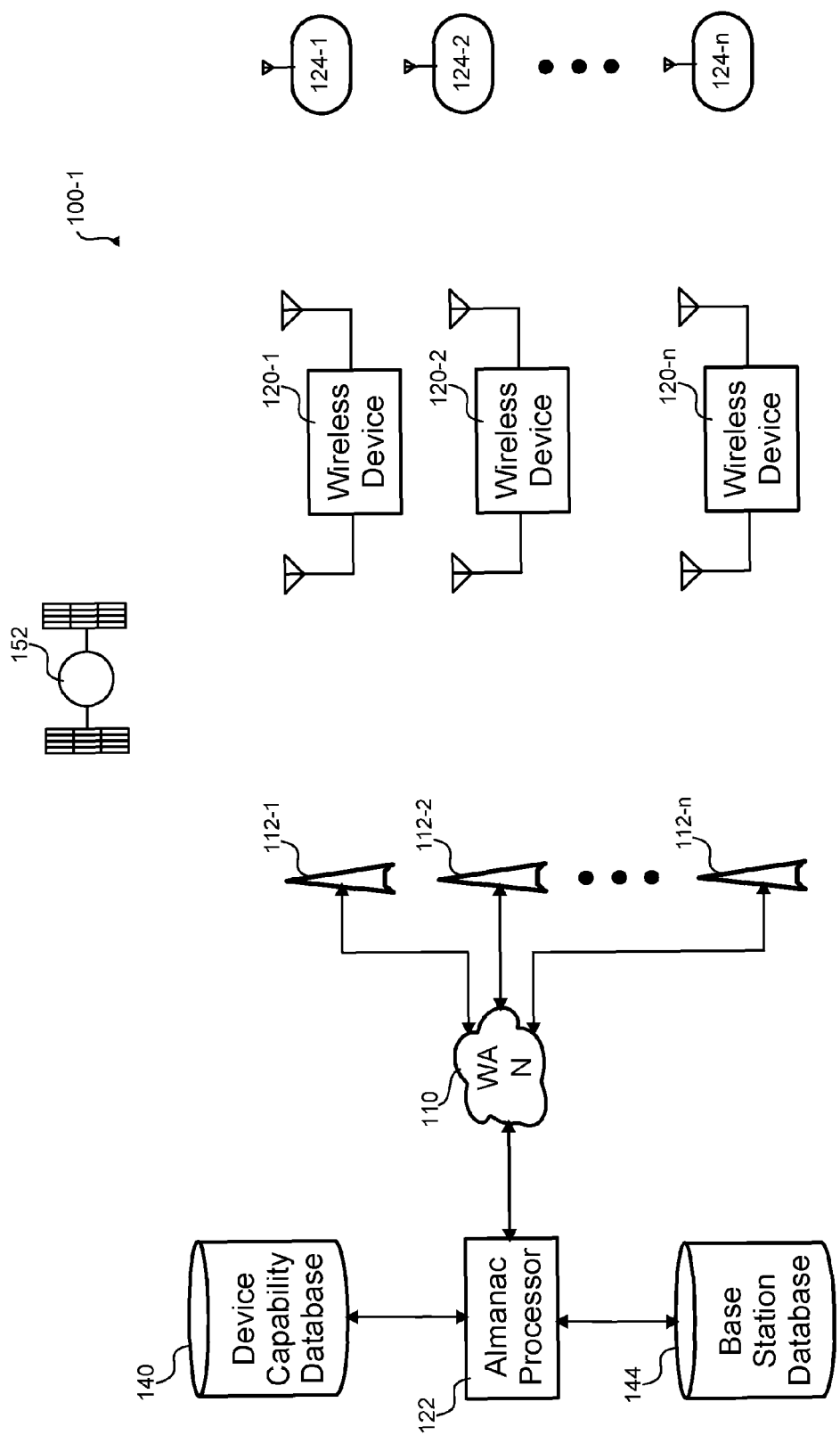
FIGS. 1A, 1B and 1C are a block diagrams of embodiments of a location determination system.

Referring initially to FIG. 1A, a block diagram of an embodiment of a location determination system 100-1 is shown. The location determination system 100 allows wireless devices 120 to find their geographic location or be located by remote entities by using satellites 152 (e.g., GLONASS, GPS, Galileo, EGNOS, Globalstar, IRIDIUM) and/or base stations 112,124 (e.g., cellular phone base station, a wireless local area network, a wireless wide area network, satellite phone, satellite Internet, or any other device that can be uniquely recognized and communicate with the wireless device 120). Cooperative base stations 112 are coupled to an almanac processor 122 by way of a wide area network (WAN) 110 in this embodiment, but other embodiments could use a local area network (LAN). The almanac processor 122 accesses a base station database 144 to tailor or customize an almanac according to the estimated location of the wireless device 120.

A wireless device 120 can communicate with any number of devices to provide location information. In this embodiment, the wireless device 120 is a cellular phone that may have any number or combination of communication modes (e.g., GSM, CDMA, TDMA, WCDMA, OFDM, GPRS, EV-DO, WiFi, Bluetooth, WiMAX, 802.xx, UWB, satellite, etc.) to transfer voice and/or data with cellular, satellite, wireless data, and/or mesh networks by way of their base stations 112,124. The wireless device 120 in other embodiments could be a tracking device, a child or parolee monitor, navigational device, wireless pager, wireless computer, PDA, asset tag, etc.

The supported communication modes for each wireless device 120 are stored in a device capability database 140 that includes information to help in determining an uncertainty factor for each location or distance measurement made by a particular wireless device 120 operating in any number of communication modes.

This embodiment shows cooperative base stations 112, uncooperative base stations 124 and a satellite location beacon 152 that could each have different communication modes. For example, cellular base stations 112,124 might support TDMA and GSM, a satellite base station might support only CDMA, or another satellite base station might support only TDMA.

Base stations 112,124 are defined herein to allow some sort of data and/or voice transport. Base stations 112,124 are often affiliated with some entity (e.g., cellular or WiFi service provider) such that only subscribers or subscribers to another system with a roaming agreement can communicate with the base station 112,124 to pass data and/or voice traffic. The base stations 112,124 may be connected to a WAN or LAN to get a tailored almanac, but only cooperative base stations 112 provide a tailored almanac. The various base stations 112,124 may have any number of or combination of communication modes (e.g., GSM, CDMA, TDMA, WCDMA, OFDM, GPRS, EV-DO, WiFi, Bluetooth, WiMAX, 802.xx, UWB, satellite, etc.) to transfer voice and/or data with cellular, satellite, wireless data, and/or mesh networks.

There are cooperative and uncooperative base stations 112,124. An cooperative base station 112 is one that allows data and/or voice communication with the wireless device 120. In one example, voice communication can be supported by Voice over IP (VoIP). Uncooperative base stations 124 may not allow data and/or voice traffic, but do provide information useful in determining a location of the wireless device. Uncooperative base stations 124 provide some type of identifier and can often be used for ranging, which is a process where the distance between the base station 124 and the wireless device 120 is determined. The identifier in the case of a WiFi base station 124, for example, includes a station identifier and MAC address. Also, some uncooperative base stations 124 allow ranging measurements, received signal strength indications and beacon signaling capabilities that can all be used to determine distance.

The base station database 144 stores the identifier information that can be used to uniquely identify each base station in that class of base stations. For example, each WiFi base station could include a MAC address as identifier information. As another example, a CDMA base station identifier could include SID, NID and Base ID or SID, MSC ID and Base ID. Characteristics of the base station 112,124 could be used in uniquely identifying the base station 112,124. For example, if two base stations had the same station identifier, but only one supported a particular communication standard, the two could be uniquely identified. Typically, a wireless device 120 would support a subset of the various communication modes. Also stored in the base station database 144 is location information that is determined for each base station 112,124 by performing surveys of the area with the wireless devices.

In one embodiment, wireless devices 120 can be used to determine the location of each base station 112,124, thereafter the location is reported back to the almanac processor 112. The location information from various wireless devices 120 for each base station 112,124 is aggregated by the almanac processor 112 to update the base station database. As more location data points are gathered, they are weighted according to the accuracy of the location information provided by the wireless device 120 and used to resolve the location of the base station with ever increasing accuracy. The accuracy of each wireless device 120 could be stored in the device capability database 140, which could have different accuracies for the various ways that a wireless device 120 could gather the information. Any uncertainty that the wireless device 120 could have in knowing its location could also be reflected in the accuracy weighting for the base station database 144.

Various types of location beacons could be used by the wireless device 120 to aid in the location determination. This embodiment uses a satellite location beacon 152, but pseudolites and terrestrial beacon systems such as LORAN could also be used. The more location references, generally, the better the location of the wireless device 120 can be determined.

This embodiment shows the almanac processor 122 separate from the cooperative base stations 112, but each cooperative base station 112 or a class of cooperative base stations 112 could have an almanac processor 112 and/or databases 140,144 in other embodiments. Some embodiments could integrate the almanac processor 122 into the wireless device 120. The base station and/or device capability databases 144,140 could also be in the wireless device 120 and updated periodically.

Figure 1B:
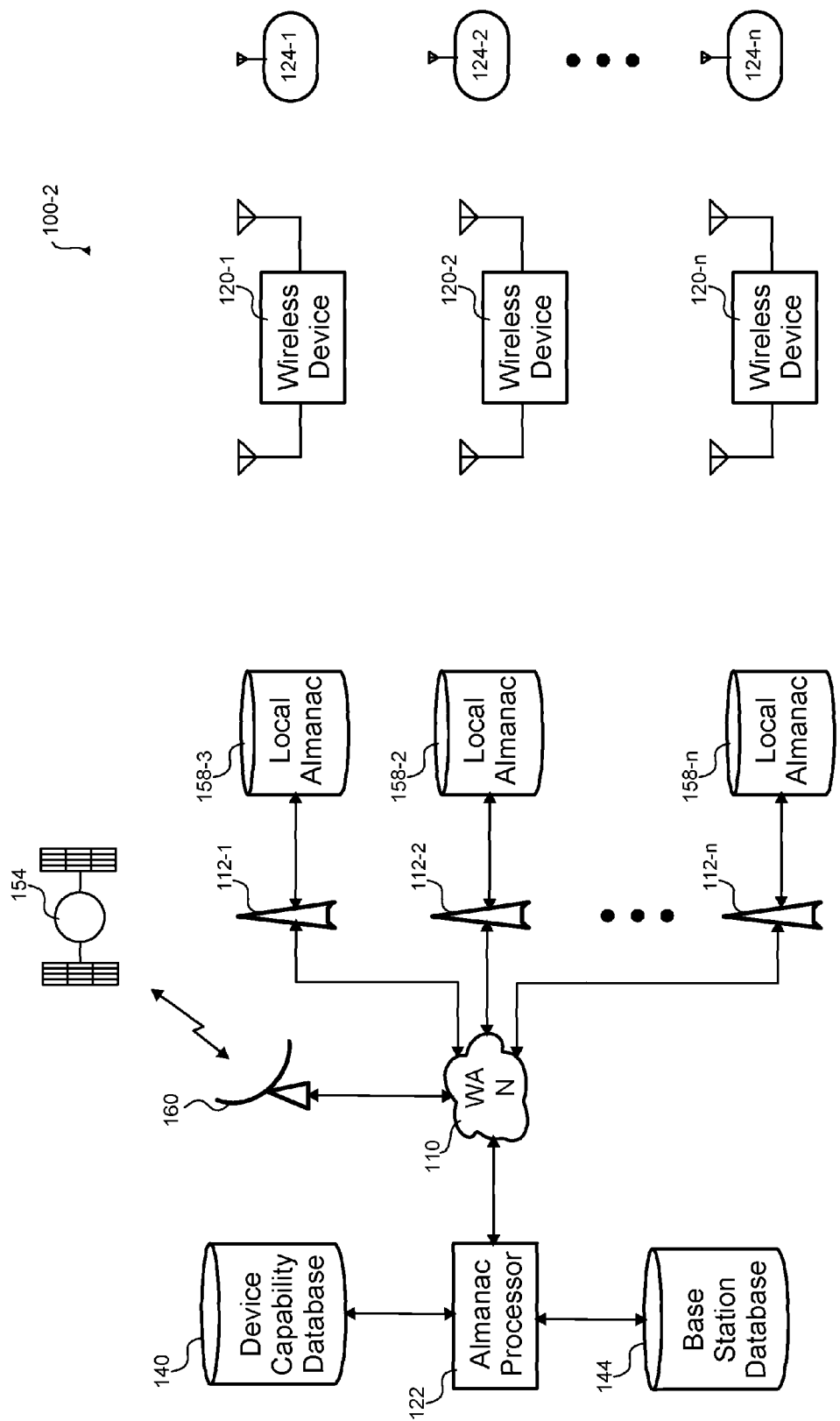

Referring next to FIG. 1B, another embodiment of the location determination system 100-2 is shown. In some embodiments, the base station database 144 is centrally located, but the base station database 144 is distributed regionally or in portions relevant to each cooperative base station 112 or a class of cooperative base stations 112 as a local almanac 158 in the present embodiment. For example, a first base station 112-1, may store a portion of the base station database 114 for its footprint and all adjacent base station footprints in a first local almanac 158-1. As another example, the first local almanac 158-1 may contain the base station database for all or select set of CDMA base stations. In yet another example, the first almanac 158-1 may not be geographically organized but contain the base stations which are part of a particular service provider network. As the centrally-located base station database 144 is updated, those changes are propagated to the various local almanacs 158 that might use the new information.

This embodiment does not use a satellite location beacon 152 or other type of location beacon, but has one or more communication satellites base stations 154 for use in voice and/or data communication. This embodiment of the communication satellite base station 154 could, but does not, have a local almanac 158 and/or databases 140,144. The communication satellite base station 154 relies upon the almanac processor 122 to produce tailored almanacs. A satellite ground station 160 communicates with the almanac processor 122 by way of the WAN 110.

Figure 1C:
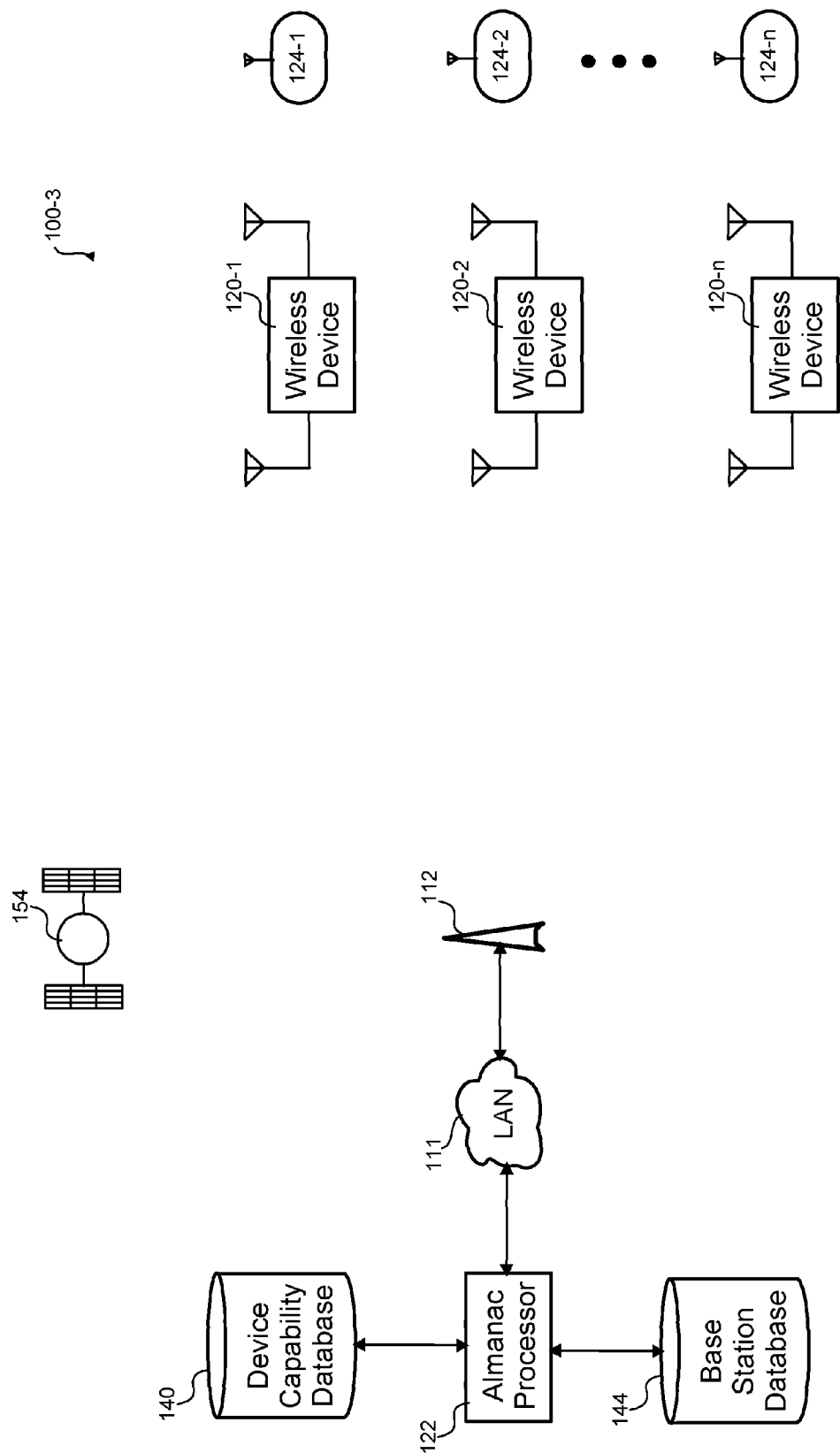

Referring next to FIG. 1C, yet another embodiment of the location determination system 100-3 is shown. In this embodiment, a cooperative base station 112 is coupled to a local area network (LAN) 111 that is coupled to an almanac processor 122 and device capability and base station databases 140,144. The information in the device capability and base station databases 140,144 could be periodically updated or reconciled with remote master versions of these databases using a WAN or the like. The satellite base station 154 in this embodiment also includes an almanac processor 122 and device capability and base station databases 140, 144, even though that level of detail is not shown in the figure.

Figure 2A:
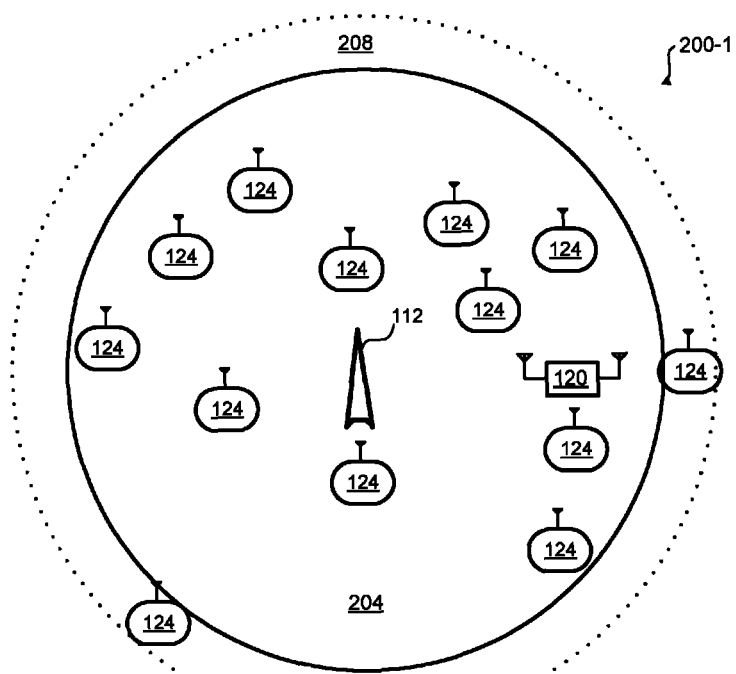
FIGS. 2A and 2B are diagrams of embodiments of a single-cell location system.
Figure 2B:
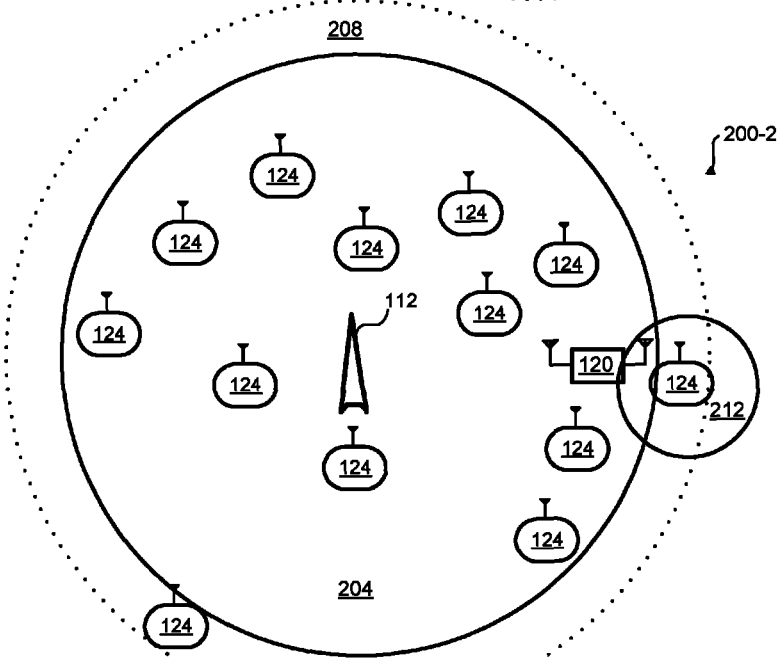

With reference to FIGS. 2A and 2B, diagrams of embodiments of a single-cell location system 200 are shown. A cooperative base station 112 has a cell footprint 204 in which it can communicate with the wireless device 120. FIG. 2A shows the uncooperative wireless base station 124 within that cell footprint 204.

On occasion, the wireless device 120 is barely within the cell footprint 204 to communicate with the cooperative base station 112, but has the ability to communicate with uncooperative base stations 124 outside this cell footprint as shown in FIG. 2B. A cell buffer zone 208 would include uncooperative base stations 124 outside the range of the cooperative base station 112, but possibly within range of a wireless device 120 within range of the cooperative base station 112. An uncooperative base station footprint 212 is shown for a base station 124 outside the cell footprint, but within communication range of the wireless device 120. Including this base station 124 in the cell buffer zone 208 accommodates this scenario.

In this embodiment, the wireless device 120 is in communication range of a single cooperative base station 112. In the cell footprint 204 of the cooperative base station 112, there are eleven uncooperative base stations 124. The cell buffer zone 208 has two more uncooperative base stations 124. When the almanac processor 122 receives a request for a tailored almanac, information for the thirteen possible uncooperative base stations are included.

In one embodiment, the cooperative base station 112 may determine a range to the wireless device 120 and the almanac processor 122 could cull the list of thirteen to those that might fall within an annular ring around the cooperative base station 112. The ring would be as thick as the range of the wireless device 120 when talking to the various uncooperative base stations 124 in a particular mode plus some error factor from determining the range to the cooperative base station 112. For example, the wireless device 120 may have a range from the cooperative base station 112 of fifty measurement units with an error factor of ten percent. In one communication mode, the range from the wireless device 120 is fifteen units. In this example, the annular ring would begin at a radius of thirty and extend to seventy measurement units. Any base station 112,124 understanding that communication mode and within that annular footprint would be included in the tailored almanac. Of course, if the annular ring extended beyond the cell buffer zone 208 the radius of the ring would be curtailed appropriately.

As the wireless device 120 may have different modes of communication to the various types of base stations, the thickness could be different for each type of base station communication mode. Further, the wireless device 120 may receive almanac information on other cooperative base stations 112 that the wireless device 120 was unaware of.

In another embodiment, the almanac processor 122 might cull the number of base stations 112,124 included in the tailored almanac. In some cases, the density of base stations 112,124 is so great that including additional base stations 112,124 that are in close proximity would be of little aid in resolving the location of the wireless device 120.

In some embodiments, the almanac processor 122 might exclude base stations 112,124 that don't have any way to uniquely identify them. For example, if two base stations had the same station identifier and did not provide any other codes to uniquely identify them, they both could be excluded from the tailored almanac. Often times, other identifiers in the communication protocol can be combined with identifiers to create a unique identifier that distinguishes the base stations 112,124. In some cases, two or more base stations 112,124 that cannot be uniquely identified are so geographically separate that a unique identifier can be formulated by knowing the geographic location of interest such that they could still be used. Only one would be included in any tailored almanac.

Figure 3A:
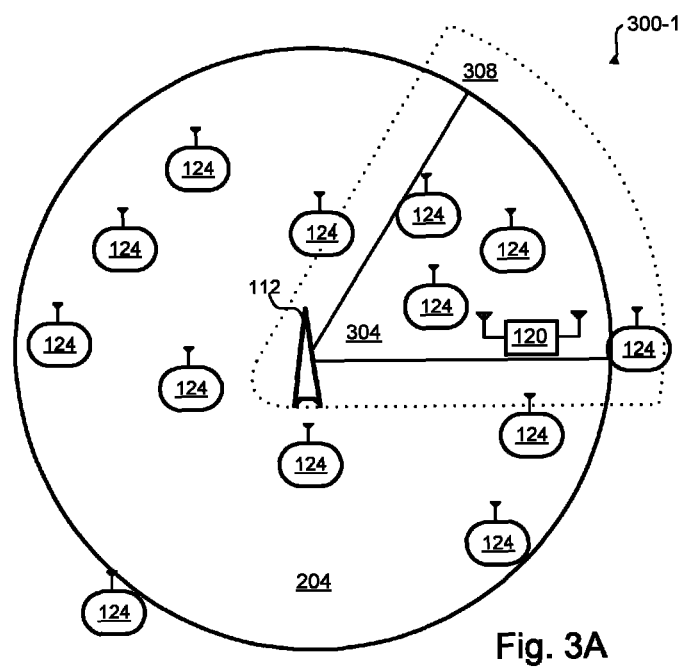
FIGS. 3A and 3B are diagrams of embodiments of a cell sector location system.
Figure 3B:
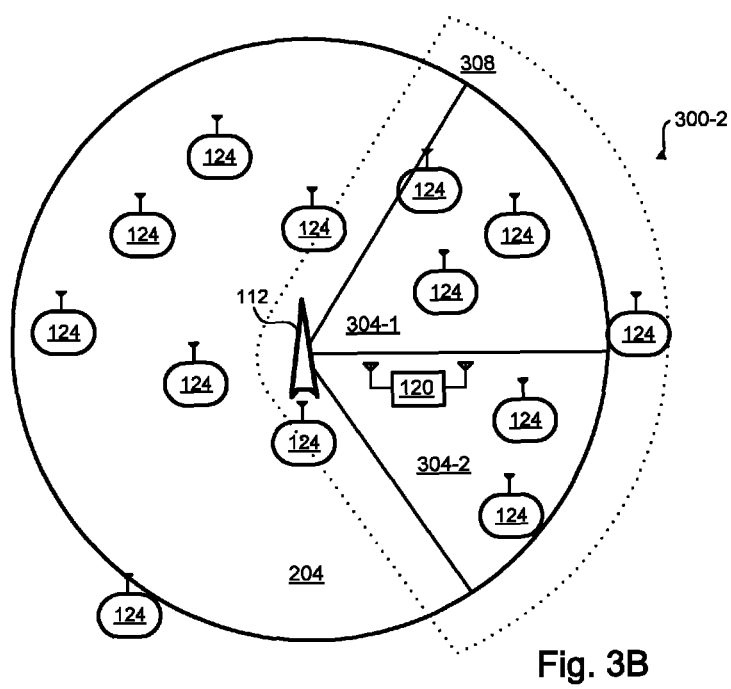

Referring next to FIGS. 3A and 3B, diagrams of embodiments of a cell sector location system 300 are shown. This embodiment has six cell sectors 304 for a cooperative base station 112, but other embodiments could have any number of cell sectors. The wireless devices 120 in the cell footprint 204 are divided among the cell sectors 304 such that the base station 112 knows which cell sector(s) 304 communicates with a particular wireless device 120. The cell sector(s) that might have the wireless device 120 are forwarded to the almanac processor 122. Any base stations 112,124 within the cell sector(s) 304 are forwarded to the cooperative base station 112 for relay to the wireless device 120.

In the embodiment of FIG. 3A, a single cell sector 304 can communicate with the wireless device 120. The almanac processor 122 would include those base stations 112, 124 in that sector 304 along with those in a sector buffer zone 308. The embodiment of FIG. 3B shows the wireless device 120 close to the edge between two cell sectors 304 such that both can receive communication. The almanac processor 122 could provide the base stations 112,124 in those two cell sectors 304 and a sector(s) buffer zone 308 around them to any wireless device 120 within or nearby that area.

Figure 4:
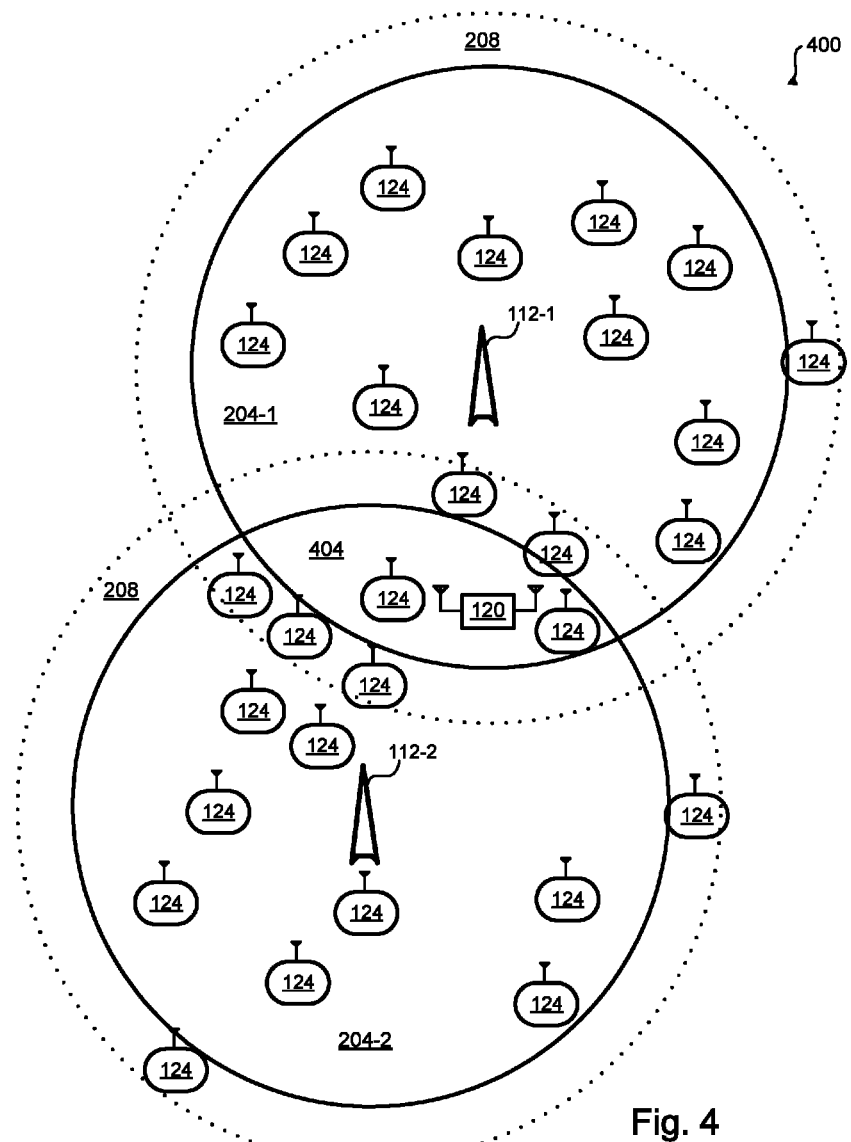
FIG. 4 is a diagram of an embodiment of an overlapping cell location system.

With reference to FIG. 4, a diagram of an embodiment of an overlapping cell location system 400 is shown. In this embodiment, two cooperative base stations 112 can communicate with the wireless device 120 such that the overlap in the cell footprints 204 is presumed to be the location of the wireless device 120. The almanac processor 122 would query the device capability and base station databases 140, 144 to determine how to tailor an almanac for this overlapping region 404. A portion of the cell buffer zone 208 that overlaps the cell buffer zone 208 of the other cell footprint 204 and cell buffer zone 208 (and vice-versa) would also be analyzed for base stations 112,124 to include in any tailored almanac.

Figure 5:
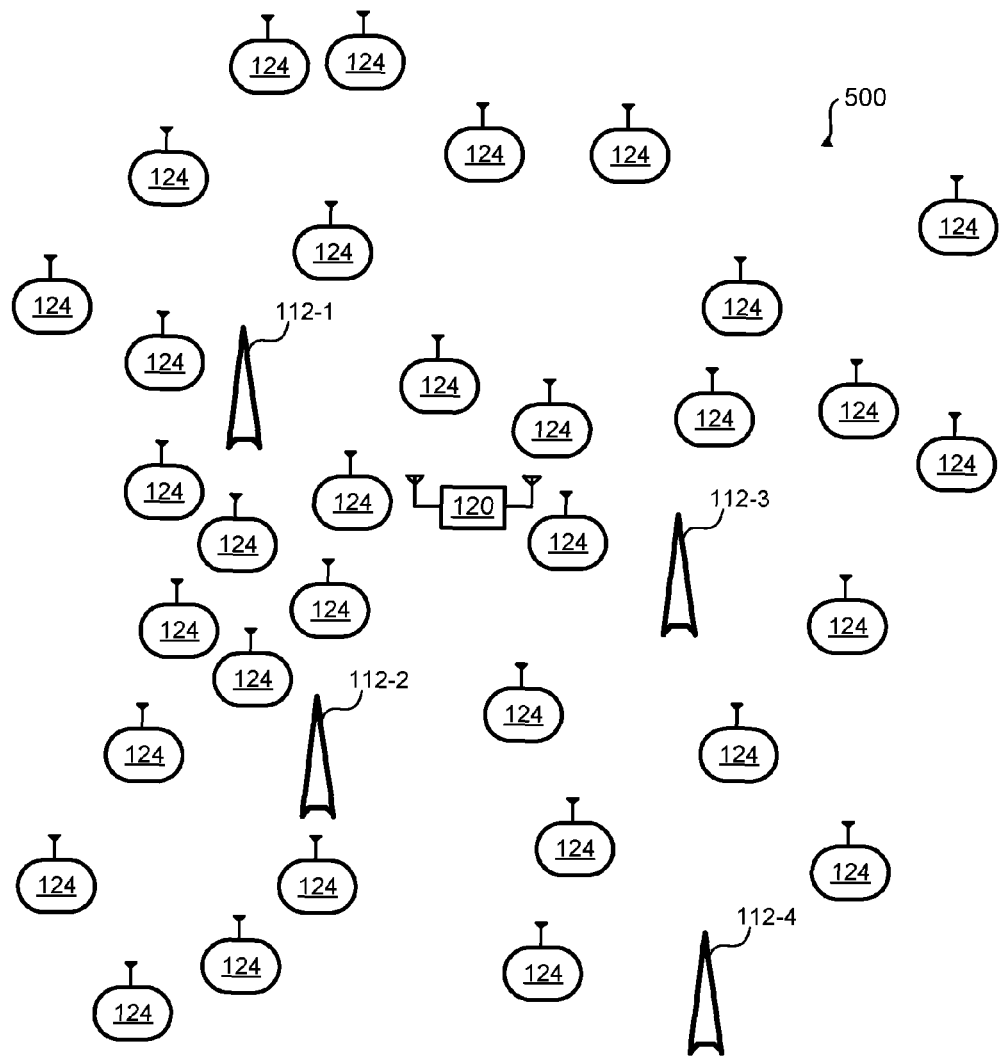
FIG. 5 is a diagram of an embodiment of a trilateration cell system.

Referring next to FIG. 5, a diagram of an embodiment of a trilateration cell system 500 is shown. In this embodiment, the wireless device 120 can communicate with three or more cooperative base stations 112-1,112-2,112-3 that are geographically separate. A general location of the wireless device 120 is determined by analyzing ranging information gathered by or from a number of cooperative base stations 112. Time of arrival (TOA) readings from one cooperative base station 112 reduces the general location to a ring around that base station 112. Two cooperative base stations 112 generating time difference of arrival (TDOA) ranging readings reduce the location to a hyperbole. Three or more can resolve the general location even further. In this embodiment, time of arrival and/or time difference of arrival measurements are used in the trilateration process.

However small the area becomes, a buffer around that area is determined to compensate for the error in the determination and address the range of the wireless device 120 to base stations 112,124. The almanac processor 122 gathers information for the base stations 112,124 likely to be in communication range for each communication mode supported by the wireless device 120.

Figure 6:
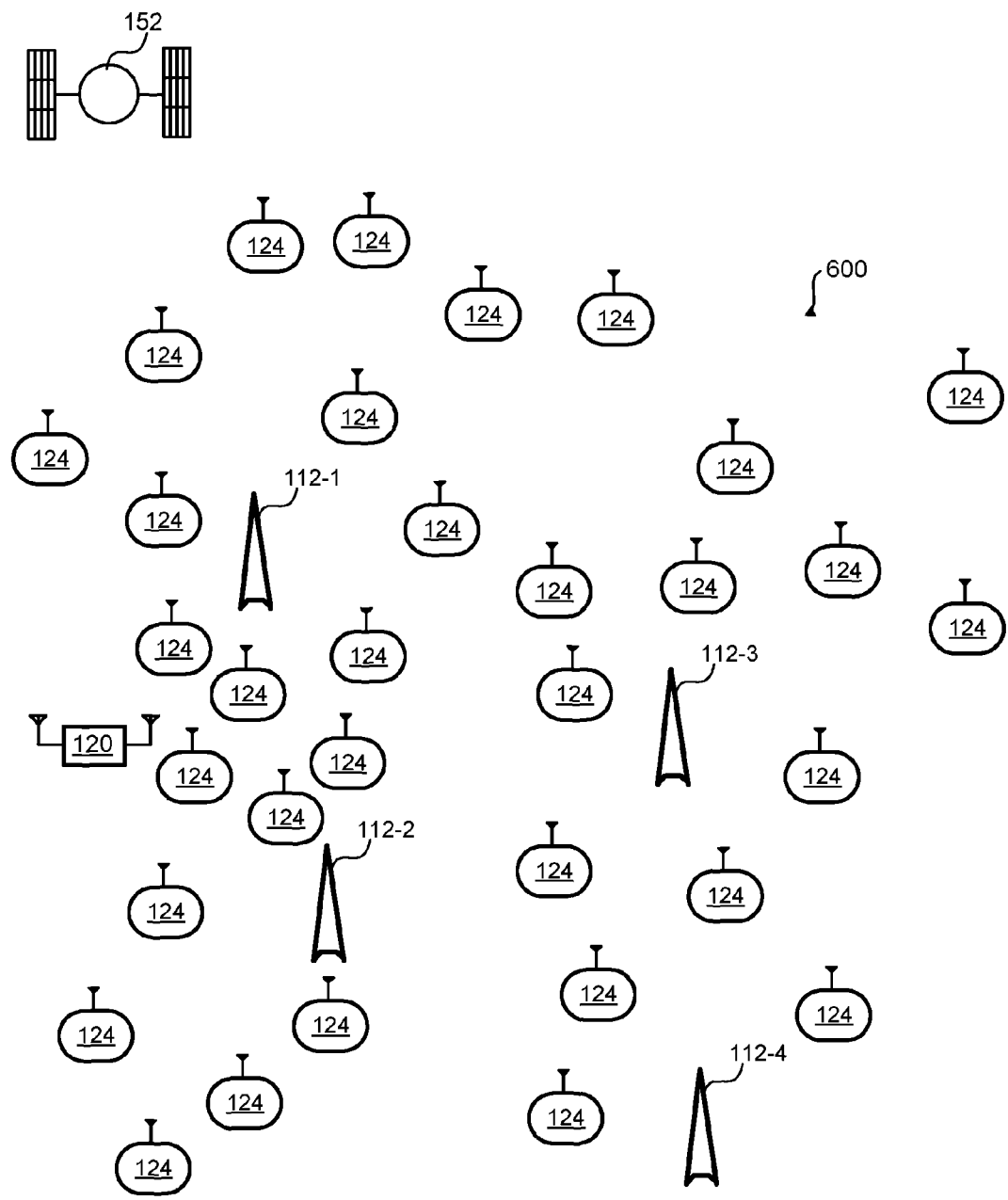
FIG. 6 is a diagram of an embodiment of a hybrid trilateration system.

With reference to FIG. 6, a diagram of an embodiment of a hybrid trilateration system 600 is shown. This embodiment shows trilateration with different types of communication modes. The wireless device 120 receives ranging information from a satellite location beacon 152 and communicates with two cooperative base stations 112-1,112-2. Between the three 152,112-1,112-2, the general location can be trilaterated and forwarded to one of the cooperative base stations 112 in exchange for a tailored almanac.

Figure 7:
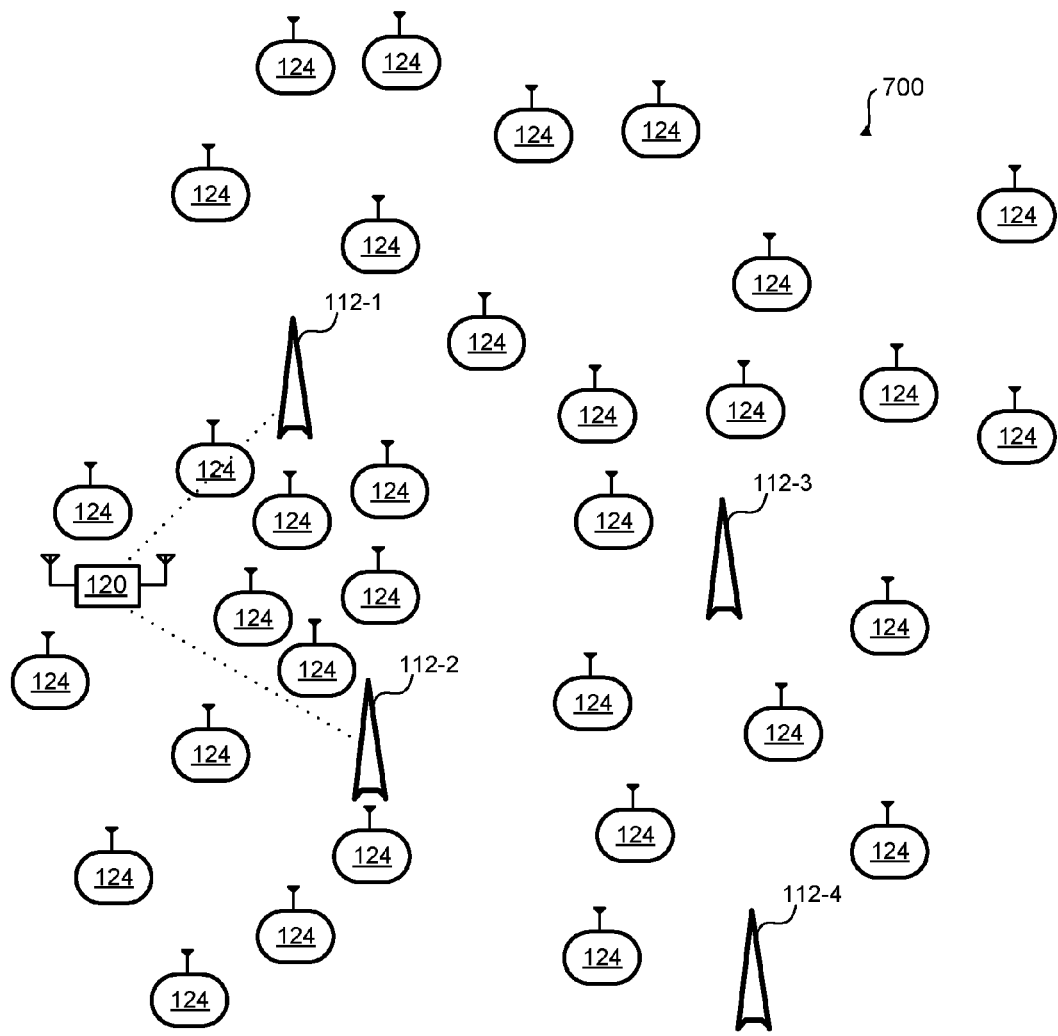
FIG. 7 is a diagram of an embodiment of an angular ranging system.

Referring next to FIG. 7, a diagram of an embodiment of an angular ranging system 700 is shown. The cooperative base stations 112 in this embodiment can estimate the angle of arrival (AoA) and distance to the wireless device. This ability allows determining a general location with a single cooperative base station 112. Where the cooperative base station 112 can only determine AoA and not range, two cooperative base stations 112-1,112-2 can determine a general location.

The above embodiments do not rely upon uncooperative base stations 124 to find an initial location estimate, but request a tailored almanac from cooperative base stations 112 for refined location estimations. Some embodiments could report the base stations 112,124 and location beacons seen and any ranging estimates to those as part of a location request. The almanac processor 112 could take this information and determine a location using the device capability, mode of operation and base station databases 140,144. In this embodiment, the initial gathering of location information is done without the benefit of a tailored almanac. Where the almanac processor 122 determines a more accurate location is required, a tailored almanac could be produced that indicates additional base stations 112,124 that are likely within range of the wireless device 120.

Figure 8:
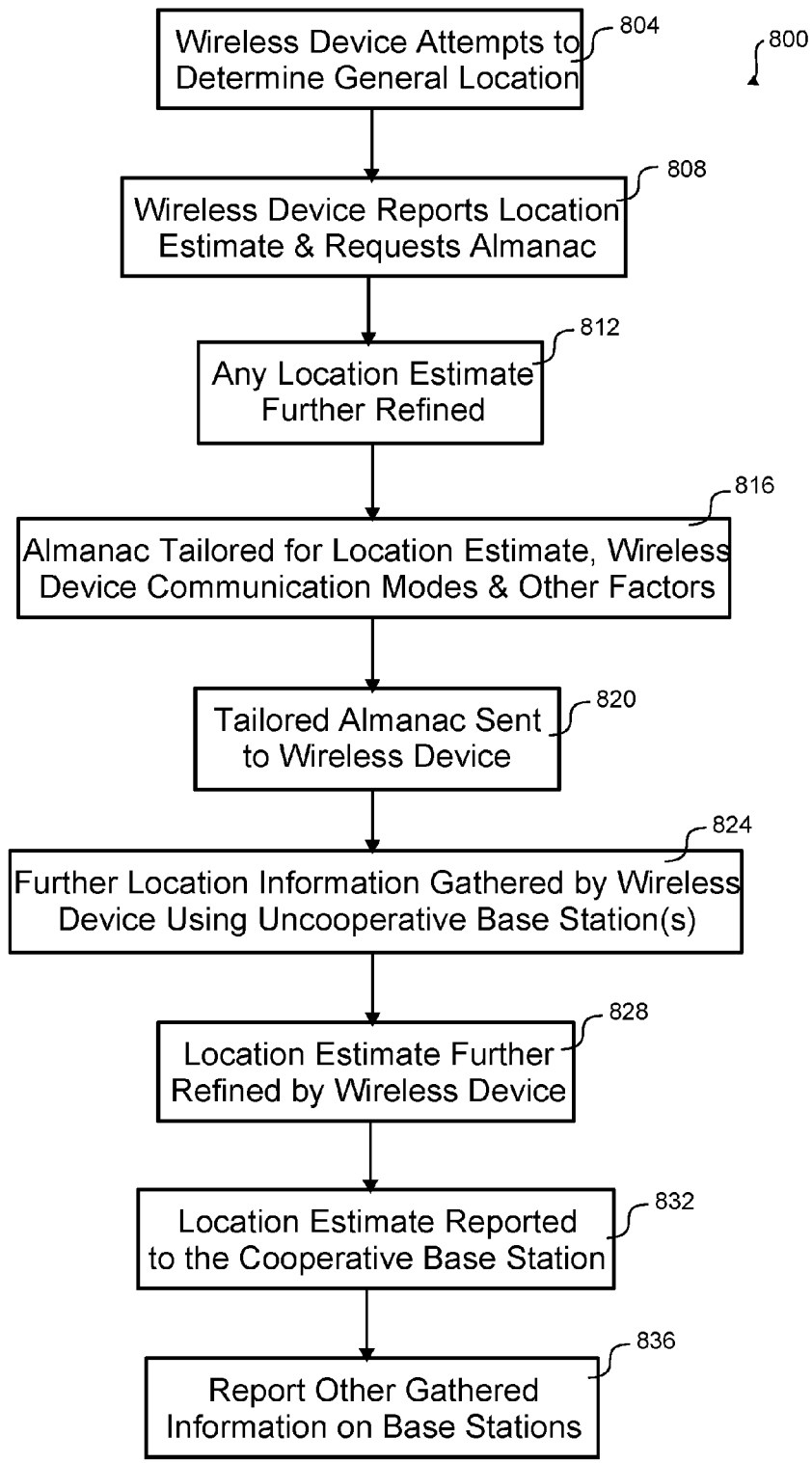
FIG. 8 is a flow diagram of an embodiment of a process for locating a position of a wireless device that has native location functions.

With reference to FIG. 8, a flow diagram of an embodiment of a process for locating a position of a wireless device 120 that has native location functions 800 is shown. The wireless device 120 could trilaterate to cooperative base stations 112 or satellite or ground location beacons to determine a general location in step 804. In step 808, the wireless device 120 reports the location estimate and requests a tailored almanac. Some wireless devices may store a base station almanac of base stations 112,124 that is updated as new tailored almanacs are received.

In this embodiment, the location estimate could be further refined outside the wireless device in step 812. For example, the cooperative base station 112 may have some location information from time of arrival or time difference of arrival. The general location is forwarded to the almanac processor 112. In step 816, the almanac processor 112 tailors an almanac by finding all base stations 112,124 that might be close enough to use in determining a location of the wireless device 120. This takes into account all the modes of communication of the wireless device 120 that are compatible with the various base stations 112,124, the likely range in those modes, and the likely location of the wireless device 120. That tailored almanac is sent over the WAN 110 to the cooperative base station 112 and relayed to the wireless device in step 820.

In step 824, further location information is gathered by the wireless device 120. This location information uses the tailored almanac and could involve uncooperative base stations 124 as well as cooperative base stations 112. In this embodiment, the wireless device 120 analyzes the location information to refine the location estimate in step 828. The location estimate is reported to a cooperative base station in step 832. During the process of determining a location, the wireless device 120 may have location information for the base stations 112,124 in the tailored almanac or those not in the almanac yet. In step 836, this location information together with the almanac-related information such as the identifications of the observed base stations is reported to a cooperative base station 112 and forwarded to the almanac processor 122 for updating the base station database 144.

Figure 9:
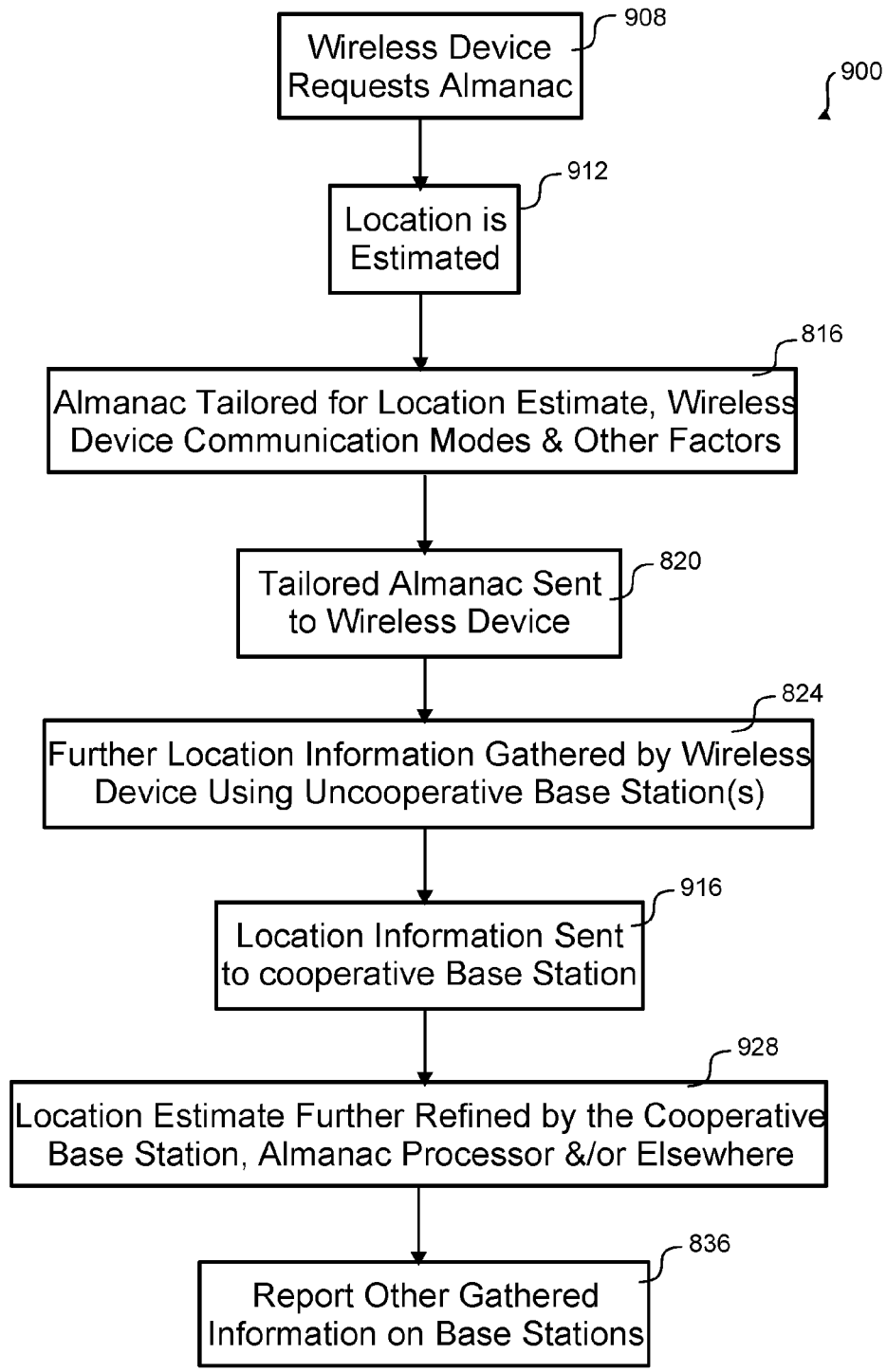
FIG. 9 is a flow diagram of another embodiment of a process for locating a position of a wireless device that has limited location functions.

Referring next to FIG. 9, a flow diagram of another embodiment of a process 900 for locating a position of a wireless device 120 that has limited location functions is shown. Some wireless devices have limited ability to independently determine their location. This embodiment relies on other parts of the location determination system 100 to analyze location information. In step 908, the wireless device 120 requests a tailored almanac. The location is estimated by the various cooperative base stations 112 in step 912.

That location estimate is passed to the almanac processor 122 for tailoring of almanac information in step 816. In step 820, the tailored almanac is sent to the wireless device 120. Step 824 gathers further location information using the tailored almanac to find uncooperative base stations 124. In step 916, the gathered location information is forwarded to the cooperative base station 112. Step 928 refines the location estimate using the location information. The refinement may be performed in the cooperative base station 112, the almanac processor 122 or any other location in communication with the cooperative base station 112. Any additional information gathered by the wireless device 120 is forwarded to the almanac processor 122 to refine the base station database 144.

Figure 10:
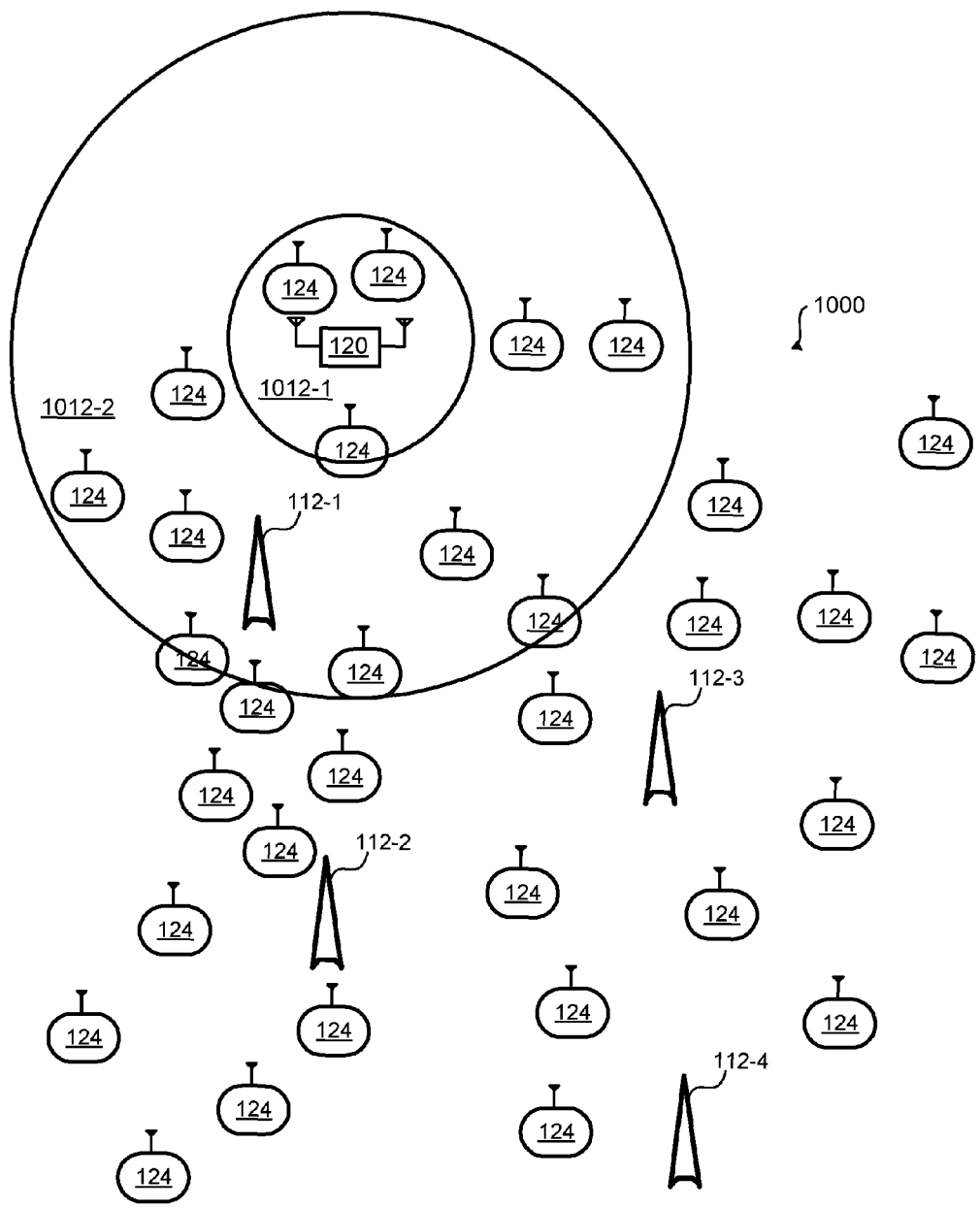
FIG. 10 is a diagram of an embodiment of system that gathers location information from uncooperative base stations.

With reference to FIG. 10, a diagram of an embodiment of system 1000 that gathers location information from uncooperative base stations 124 is shown. Once the tailored almanac is received by the wireless device 120, it attempts to locate those base stations listed in the almanac. Shown in the embodiment of FIG. 10 is a dual-mode wireless device 120 that supports two communication modes. One communication mode has a first footprint 1012-1 and the second has a larger footprint 1012-2. The tailored almanac would have all base stations 112,124 in the first footprint 1012-1 that use the first communication mode and all base stations 112,124 in the second footprint 1012-2 that use the second communication mode.

In some embodiments, the almanac processor could perform a motion estimation for the wireless device 120 such that footprints 1012 are adjusted for the likely position of the wireless device 120 when the tailored almanac would be used. Other embodiments, could just expand the footprint according the likely speed or maximum speed of the wireless device 120 should it travel in any direction. In yet other embodiments, a history of handoffs between various base stations can be used to tailor the almanac information.

Figure 11:
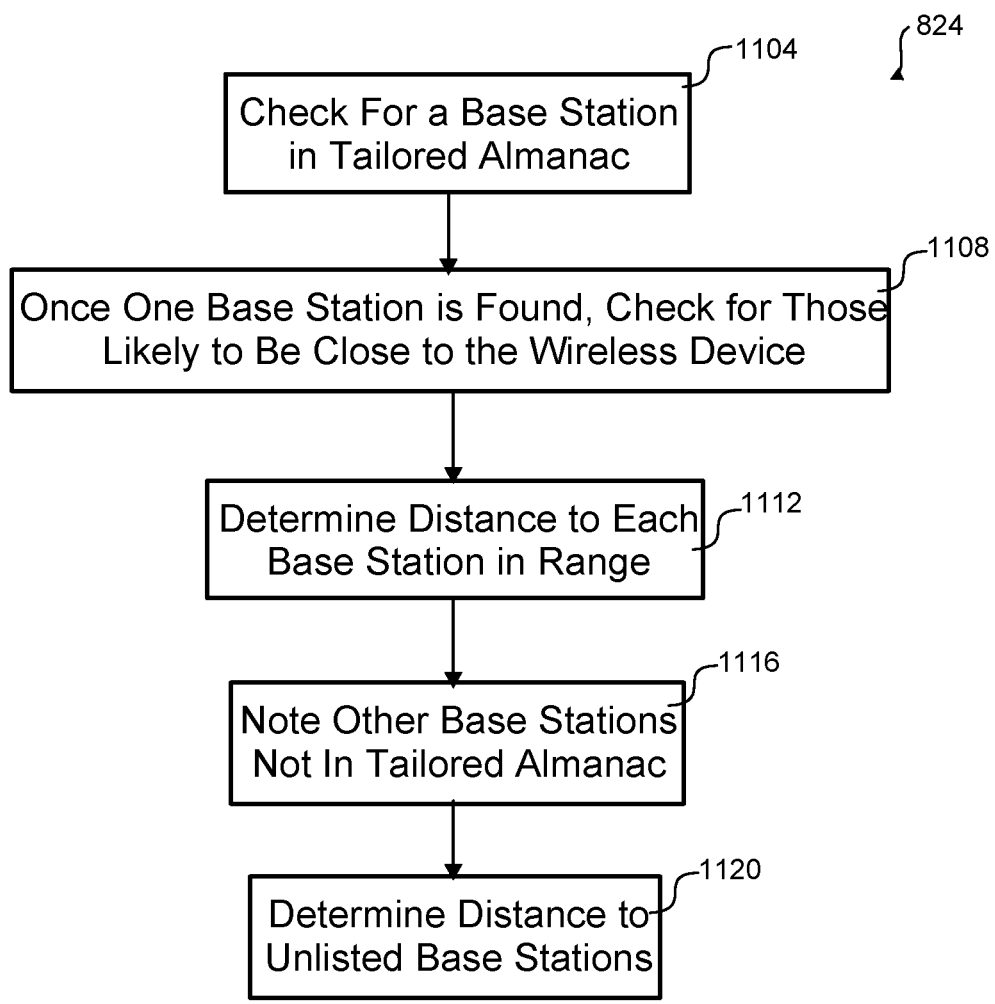
FIG. 11 is a flow diagram of an embodiment of a process for gathering location information from base stations.

Referring next to FIG. 11, a flow diagram of an embodiment of a process 1100 for gathering location information from base stations 112,124 is shown. The process 1100 begins in step 1104 where the wireless device 120 checks for base stations 112,124 in the tailored almanac. This could be done by randomly choosing base stations in the almanac 112,124. In some embodiments, the base stations 112,124 could be pre-randomized so that the wireless device 120 could take them in order.

In another embodiment, the almanac processor 122 could choose another scheme for organizing the base stations 112,124 to quickly find one. For example, they may be organized by communication mode and footprint 1012 size. The footprint of the almanac is more quickly covered by using communication modes with larger range.

Once one base station 112,124 in the almanac is found in step 1108, it may be possible to exclude some of the base stations 112,124 in the almanac. After running through the various base stations 112,124 to find those in range of the wireless device 120, the distance to each is estimated in step 1112.

Uncooperative base stations 124 still give some information even though data communication is not possible. They will identify themselves, which indicates the wireless device 120 is close enough to communicate. Some uncooperative base stations 124 will indicate signal strength of a received signal. Other uncooperative base stations 124 will acknowledge a message and that propagation time can be correlated to a distance traveled. The signal strength of a signal from the uncooperative base station 124 can intimate distance when the initial or expected signal strength can be determined.

In some embodiments, the wireless device 120 gathers information on base stations 112,124 not included in the almanac in step 1116. Often the base stations 112,124 self identify themselves. If resources are available, in step 1120 ranging may be performed to the unlisted base stations 112,124 for later report-back to the almanac processor. In other embodiments, the footprint of the base station or the overlaps of more than one footprint can be analyzed to determine the general location of the wireless device 120.

Figure 12:
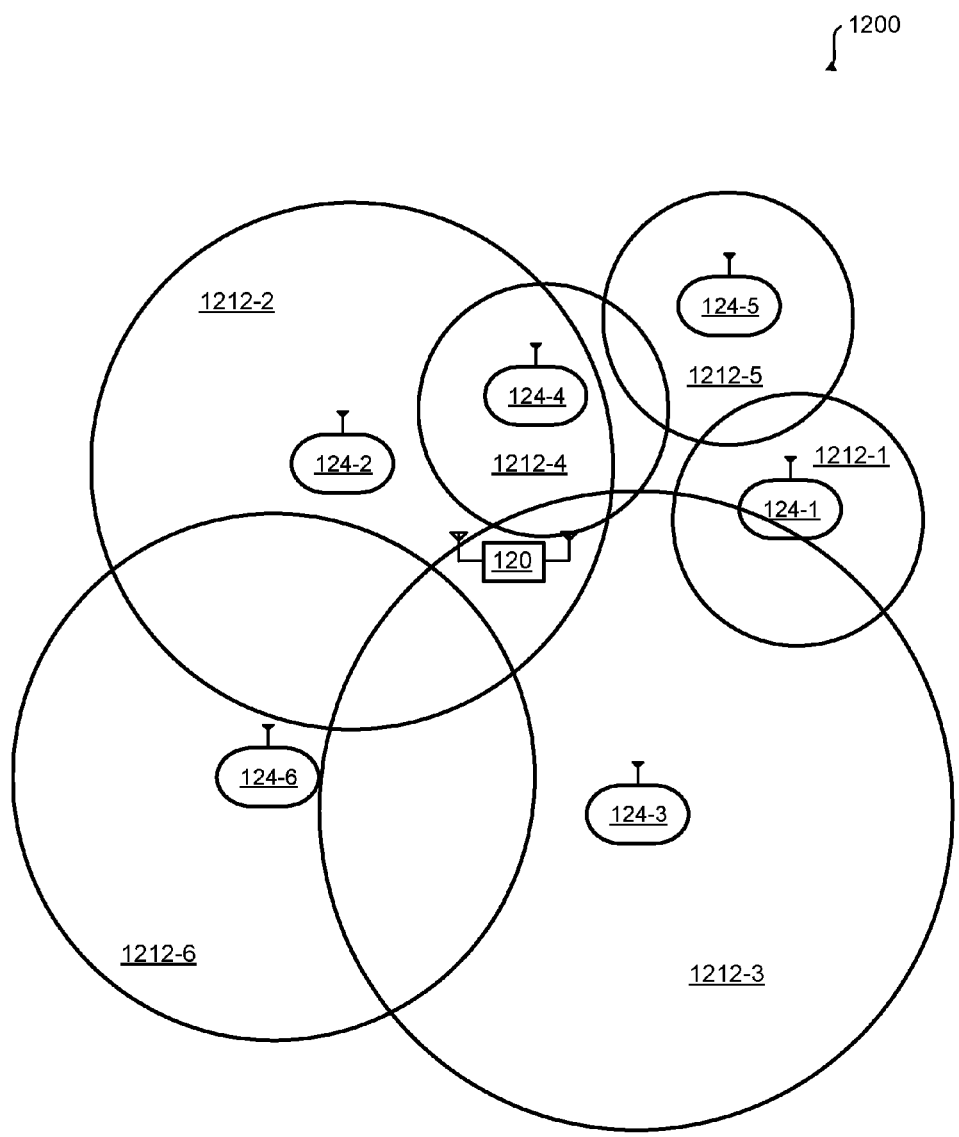
FIG. 12 is a diagram of another embodiment of system that gathers location information from uncooperative base stations.

With reference to FIG. 12, a diagram of another embodiment of system 1200 that gathers location information from uncooperative base stations 124 is shown. The depicted uncooperative base stations 124 are those identified in a tailored almanac as likely to be in communication range. In this embodiment, three uncooperative base stations 124-1, 124-4,124-5 operate in a first communication mode with first communication footprints 1212-1, 1212-4,1212-5; two uncooperative base stations 124-2,124-6 operate in a second communication mode with second communication footprints 1212-2,1212-6; and one uncooperative base station 124-3 operates in a third communication mode with a third communication footprint 1212-3. The current position of the wireless device 120 only allows communication with three uncooperative base stations 124-2,124-3,124-4. Even without ranging measurements, this can narrow down the location of the wireless device 120, but with ranging measurements, a very precise location can be determined.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A terrestrial base station locating method comprising:
determining, based at least in part on measurements of satellite signals, a location of a mobile wireless device having multiple bi-directional communication modes;
gathering location information for a plurality of base stations by the mobile wireless device, the location information including ranging information for the plurality of base stations at the location, the plurality of base stations comprising a cooperative terrestrial base station that can communicate with the mobile wireless device in a mode that allows unique identification of the mobile wireless device and an uncooperative WiFi terrestrial base station capable of bi-directional communications and configured to prevent data and/or voice communications with the mobile wireless device, wherein the uncooperative WiFi terrestrial base station is configured to acknowledge a message received from the mobile wireless device;
gathering identification information for each of the plurality of base stations by the mobile wireless device;
establishing a bi-directional communication link between the mobile wireless device and a cooperative terrestrial WiFi base station; and
sending the location, the location information for the plurality of base stations, and the identification information for each of the plurality of base stations to the almanac processor via the cooperative terrestrial WiFi base station from the mobile wireless device in response to establishing the bi-directional communication link between the mobile wireless device and the cooperative terrestrial WiFi base station.

2. The method of claim 1, further comprising:
requesting, by the mobile wireless device, base station information; and
receiving, at the mobile wireless device, a tailored almanac of base station information, contents of the tailored almanac of base station information being based on a location of the mobile wireless device.

3. The method of claim 2, wherein the tailored almanac of base station information is received from the almanac processor.

4. The method of claim 3, wherein the tailored almanac of base station information includes the identification information for each of the plurality of base stations sent by the mobile wireless device to the almanac processor.

5. The method of claim 1, wherein the plurality of base stations comprises a cellular phone base station.

6. The method of claim 1, wherein the uncooperative base station comprises an uncooperative wireless local area network base station.

7. The method of claim 1, wherein gathering the identification information for the plurality of base stations comprises wirelessly receiving at least some of the identification information for the plurality of base stations, the bi-directional communication link is a wireless bi-directional communication link, and sending the location information for each of the plurality of base stations and sending the identification information for each of the plurality of base stations comprises wirelessly sending the location information for each of the plurality of base stations and wirelessly sending the identification information for each of the plurality of base stations.

8. The method of claim 1, wherein sending the location, the location information for the plurality of base stations, and the identification information for each of the plurality of base stations occurs only in response to establishing the bi-directional communication link between the mobile wireless device and the cooperative terrestrial WiFi base station.

9. The method of claim 1, wherein the plurality of base stations comprise Bluetooth® terrestrial base stations.

10. The method of claim 1, wherein the ranging information comprises signal strength information or timing information or a combination thereof.

11. A mobile wireless device comprising:
means for bi-directional communication in multiple communication modes;
means for determining, based at least in part on measurements of satellite signals, a location of the mobile wireless device;
means for gathering location information for a plurality of base stations, the location information including ranging information for the plurality of base stations at the location, the plurality of base stations comprising a cooperative terrestrial base station that can communicate with the mobile wireless device in a mode that allows unique identification of the mobile wireless device and an uncooperative WiFi terrestrial base station capable of bi-directional communications and configured to prevent data and/or voice communications with the mobile wireless device, wherein the uncooperative WiFi terrestrial base station is configured to acknowledge a message received from the mobile wireless device;
means for gathering identification information for each of the plurality of base stations;
means for establishing a bi-directional communication link between the mobile wireless device and a cooperative terrestrial WiFi base station; and
means for sending the location, the location information for the plurality of base stations and the identification information for each of the plurality of base stations to an almanac processor via the cooperative terrestrial WiFi base station in response to establishing the bi-directional communication link between the mobile wireless device and the cooperative terrestrial WiFi base station.

12. The mobile wireless device of claim 11, further comprising:
means for requesting base station information; and
means for receiving a tailored almanac of base station information, contents of the tailored almanac of base station information being based on a location of the mobile wireless device.

13. The mobile wireless device of claim 12, wherein the tailored almanac of base station information includes the identification information for the plurality of base stations.

14. The mobile wireless device of claim 11, wherein the plurality of base stations comprises a cellular phone base station.

15. The mobile wireless device of claim 11, wherein the uncooperative base station comprises an uncooperative wireless local area network base station.

16. The mobile wireless device of claim 11, wherein the plurality of base stations comprise Bluetooth® terrestrial base stations.

17. The mobile wireless device of claim 11, wherein the ranging information comprises signal strength information or timing information or a combination thereof.

18. A mobile wireless device comprising:
a network interface configured to communicate bi-directionally in multiple communication modes; and
a processor communicatively coupled to the network interface and configured to:
determine, based at least in part on measurements of satellite signals, a location of the mobile wireless device;
gather, via the network interface, location information for a plurality of base stations, the location information including ranging information for the plurality of base stations at the location, the plurality of base stations comprising a cooperative terrestrial base station that can communicate with the mobile wireless device in a mode that allows unique identification of the mobile wireless device and an uncooperative WiFi terrestrial base station capable of bi-directional communications and configured to prevent data and/or voice communications with the mobile wireless device, wherein the uncooperative WiFi terrestrial base station is configured to acknowledge a message received from the mobile wireless device;
gather, via the network interface, identification information for each of the plurality of base stations;
establish, via the network interface, a bi-directional communication link with a cooperative terrestrial WiFi base station; and
send, via the network interface, the location, the location information for the plurality of base stations and the identification information for each of the plurality of base stations to an almanac processor via the cooperative terrestrial WiFi base station in response to establishing the bi-directional communication link between the mobile wireless device and the cooperative terrestrial WiFi base station.

19. The mobile wireless device of claim 18, wherein the processor is further configured to:
request, via the network interface, base station information; and
receive, via the network interface, a tailored almanac of base station information, contents of the tailored almanac of base station information being based on a location of the mobile wireless device.

20. The mobile wireless device of claim 19, wherein the tailored almanac of base station information includes the identification information for the plurality of base stations.

21. The mobile wireless device of claim 18, wherein the plurality of base stations comprises a cellular phone base station.

22. The mobile wireless device of claim 18, wherein the uncooperative base station comprises an uncooperative wireless local area network base station.

23. The mobile wireless device of claim 18, wherein the plurality of base stations comprise Bluetooth® terrestrial base stations.

24. The mobile wireless device of claim 18, wherein the ranging information comprises signal strength information or timing information or a combination thereof.

25. A non-transitory computer-readable medium having stored thereon computer-readable instructions configured to cause a computer of a mobile wireless device to:
- determine, based at least in part on measurements of satellite signals, a location of the mobile wireless device;
- gather location information for a plurality of base stations, the location information including ranging information for the plurality of base stations at the location, the plurality of base stations comprising a cooperative terrestrial base station that can communicate with the mobile wireless device in a mode that allows unique identification of the mobile wireless device and an uncooperative WiFi terrestrial base station capable of bi-directional communications and configured to prevent data and/or voice communications with the mobile wireless device, wherein the uncooperative WiFi terrestrial base station is configured to acknowledge a message received from the mobile wireless device;
- gather identification information for each of the plurality of base stations;
- establish a bi-directional communication link between the mobile wireless device and a cooperative terrestrial WiFi base station; and
- send the location, the location information for the plurality of base stations and the identification information for each of the plurality of base stations to an almanac processor via the cooperative terrestrial WiFi base station in response to establishing the bi-directional communication link between the mobile wireless device and the cooperative terrestrial WiFi base station.

26. The computer-readable medium of claim 25, further comprising instructions configured to cause the computer to:
- request base station information; and
- receive a tailored almanac of base station information, contents of the tailored almanac of base station information being based on a location of the mobile wireless device.

27. The computer-readable medium of claim 26, wherein the tailored almanac of base station information includes the identification information for the plurality of base stations.

28. The computer-readable medium of claim 25, wherein the plurality of base stations comprises a cellular phone base station.

29. The computer-readable medium of claim 25, wherein the uncooperative base station comprises an uncooperative wireless local area network base station.

30. The computer-readable medium of claim 25, wherein the plurality of base stations comprise Bluetooth® terrestrial base stations.

31. The computer-readable medium of claim 25, wherein the ranging information comprises signal strength information or timing information or a combination thereof.

* * * * *